United States Patent

Tayama et al.

[11] Patent Number: 6,161,143
[45] Date of Patent: Dec. 12, 2000

[54] DATA TRANSFER SYSTEM INCLUDING A TERMINAL AND A BACK-UP TERMINAL AND METHOD FOR CONTROLLING THEREOF

[75] Inventors: Hideyuki Tayama; Akihiko Iura, both of Kawasaki, Japan

[73] Assignee: Fujitsu Limited, Kawasaki, Japan

[21] Appl. No.: 09/119,233

[22] Filed: Jul. 21, 1998

[30] Foreign Application Priority Data

Dec. 26, 1997 [JP] Japan .................................. 9-358803

[51] Int. Cl.$^7$ .................................................. G06F 15/173
[52] U.S. Cl. ............................................ 709/238; 709/239
[58] Field of Search ...................................... 709/238, 239

[56] References Cited

U.S. PATENT DOCUMENTS

| | | | |
|---|---|---|---|
| 5,414,837 | 5/1995 | Kotatsu .................................. | 709/219 |
| 5,426,427 | 6/1995 | Chinnock et al ........................ | 709/239 |
| 5,535,334 | 7/1996 | Merkley et al. ......................... | 709/239 |
| 5,721,817 | 2/1998 | Kurihara et al. ........................ | 709/227 |
| 5,764,914 | 6/1998 | Goto et al. .............................. | 709/227 |
| 5,931,916 | 8/1999 | Barker et al. ............................ | 709/239 |

*Primary Examiner*—Krisna Lim
*Attorney, Agent, or Firm*—Armstrong, Westerman, Hattori, McLeland & Naughton

[57] ABSTRACT

A data transfer system enables a terminal to download data from a base station through another terminal even if the terminal in question is unable to communicate with the base station. The system includes the base station connected to a host system, and terminals for communicating with the base station. The terminals download data from the host system through the base station. If a given terminal is unable to communicate with the base station, the given terminal downloads the data from a second terminal, if the data is stored in the second terminal. Also provided is a method of realizing such a data transfer system.

8 Claims, 13 Drawing Sheets

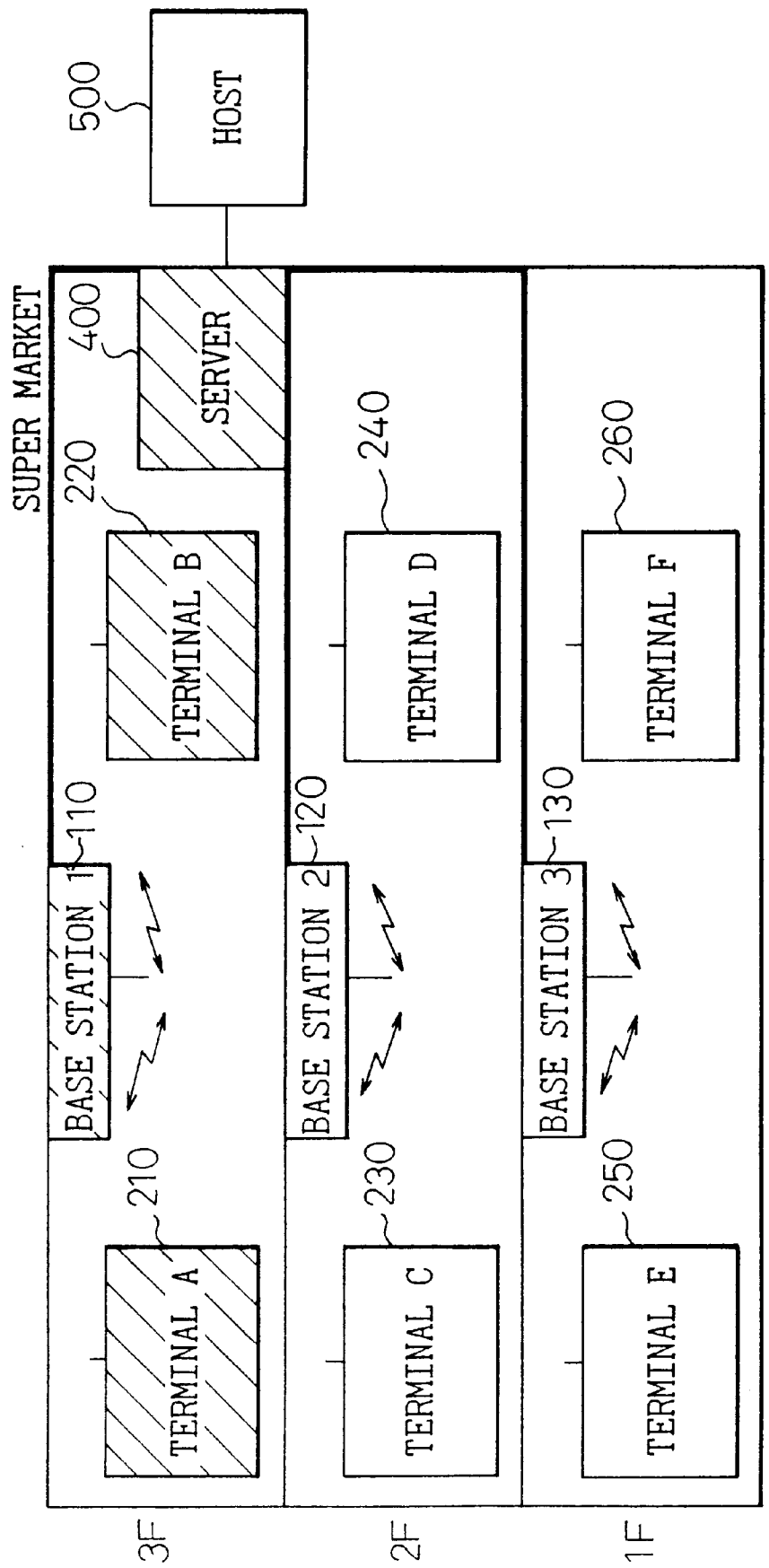

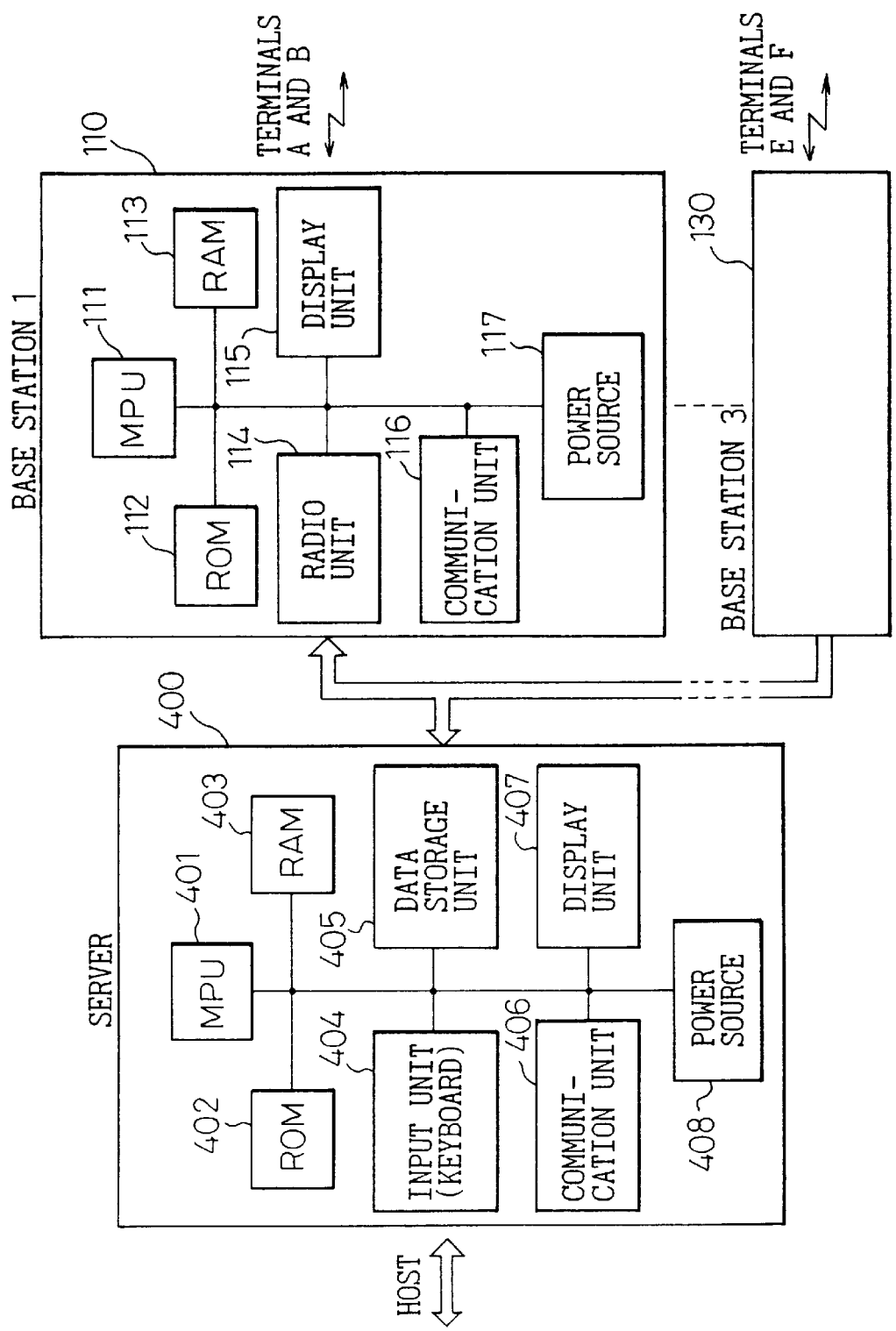

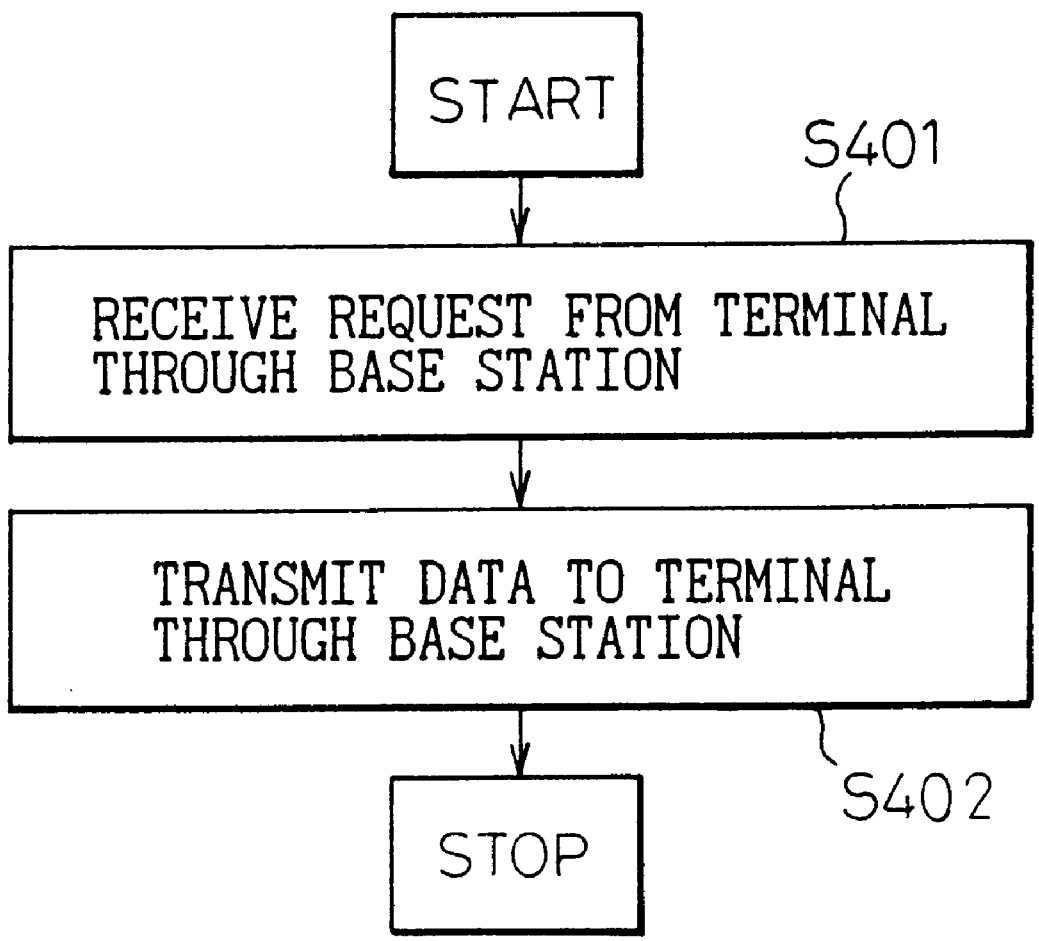

DATA TRANSFER SYSTEM INCLUDING A TERMINAL AND A BACK-UP TERMINAL AND METHOD FOR CONTROLLING THEREOF

BACKGROUND OF THE INVENTION

1. Field of the Invention

The present invention relates to a data transfer system and, particularly, to a system for, and method of, downloading data from a host to terminals by radio through a base station.

2. Description of the Related Art

Supermarkets and department stores employ exclusive-use data terminals such as point-of-sale (POS) terminals to manage commodities. The terminals are connected by radio to a base station installed on, for example, the ceiling of the sales floor, and the base station is connected to a commodity distribution center having a host computer. When requested, the terminals download master data such as the numbers and prices of commodities from the host computer through the base station.

A store usually has electromagnetic obstacles such as metal exhibits and steel firewalls to prevent the terminals from communicating with the base station. If a terminal held by a clerk in the store cannot communicate with the base station due to such obstacles, the clerk must move to another location where communication is possible, or the obstacles must be removed or rearranged so that the clerk may communicate with the base station.

Forcing the clerk to move to another spot reduces the effectiveness of the clerk. If the obstacles must be removed or rearranged, it limits the locations able to exhibit commodities and creates areas where no commodities can be placed.

SUMMARY OF THE INVENTION

An object of the present invention is to provide a radio system that allows a first terminal to download data from a second terminal that has already downloaded the data from a host computer through a base station, if the first terminal is unable to communicate with the base station. The system also allows the first terminal to download the data from the host computer through the second terminal and base station. The present invention also provides a method of realizing such a radio system.

In order to accomplish the objects, the present invention provides a data transfer system having a base station connected to a host system, and the terminals for communicating with the base station and downloading data from the host system through the base station. Each of the terminals has a terminal communication controller for controlling the downloading of data between the terminals. The terminal communication controller has a request unit and a transmission unit. The request unit issues a request for data to another terminal if the terminal communication controller is unable to communicate with the base station. The transmission unit transmits data to another terminal in response to a request for the data therefrom if the data is stored in its own terminal.

The terminal communication controller may further have a download unit for downloading data through the base station, if the data is not stored in its own terminal, in response to a request for the data from a data requesting terminal, and a unit for transmitting the downloaded data to the data requesting terminal. The terminal communication controller may have a relay unit for relaying a request for data from a data requesting terminal to the base station if the data is not stored in its own terminal, and relaying the data from the base station to the data requesting terminal.

The present invention also provides a terminal for communicating with a base station connected to a host system and downloading data from the host system through the base station. The terminal has a communication controller for controlling communication with another device, a storage unit for storing downloaded data, and a unit for determining whether or not communication with the base station is possible and, if it is impossible, requesting another terminal that is able to communicate with the base station to download data.

The present invention also provides a terminal for communicating with other devices. The terminal has a controller for controlling communication with other devices, a reception unit for receiving, from a first device, a request for downloading data, and a unit for determining whether or not the data is stored in its own terminal. If the data is stored in its own terminal, the terminal transfers the data to the first device, and if not, requests a second device to download the data.

The present invention also provides a method of transferring data from a host system to terminals through a base station. The base is connected to the host system, and the terminals communicate with the base station when downloading the data from the host system. The method including the steps of determining whether or not a first terminal that intends to download data is able to communicate with the base station, requesting a second terminal for the data if the first terminal is unable to communicate with the base station, and transmitting the data from the second terminal to the first terminal if the data is stored in the second terminal.

If the first terminal is unable to communicate with the base station and if the data is not stored in the second terminal, the method includes the steps of requesting the second terminal, which is able to communicate with the base station, to download the data, and making the second terminal download the data through the base station and transmit the downloaded data to the first terminal. The method may have the step of making the second terminal relay the data from the base station to the first terminal without downloading the data to the second terminal.

BRIEF DESCRIPTION OF THE DRAWINGS

The present invention will be more clearly understood from the description as set forth below with reference to the accompanying drawings, in which:

FIG. 2 shows the system of FIGS. 1A and 1B applied to a supermarket;

FIG. 3 shows communication between a server and base stations of the system of FIG. 2;

FIG. 13 shows a control flow of the server according to the present invention.

DESCRIPTION OF THE PREFERRED EMBODIMENTS

The basic operation of a system for transferring data by radio according to the present invention will be explained. For the sake of clear understanding of the present invention, the following explanation covers transferring master data including commodity numbers and prices. The present invention, however, is applicable to handle any kind of data.

Figure 1A:
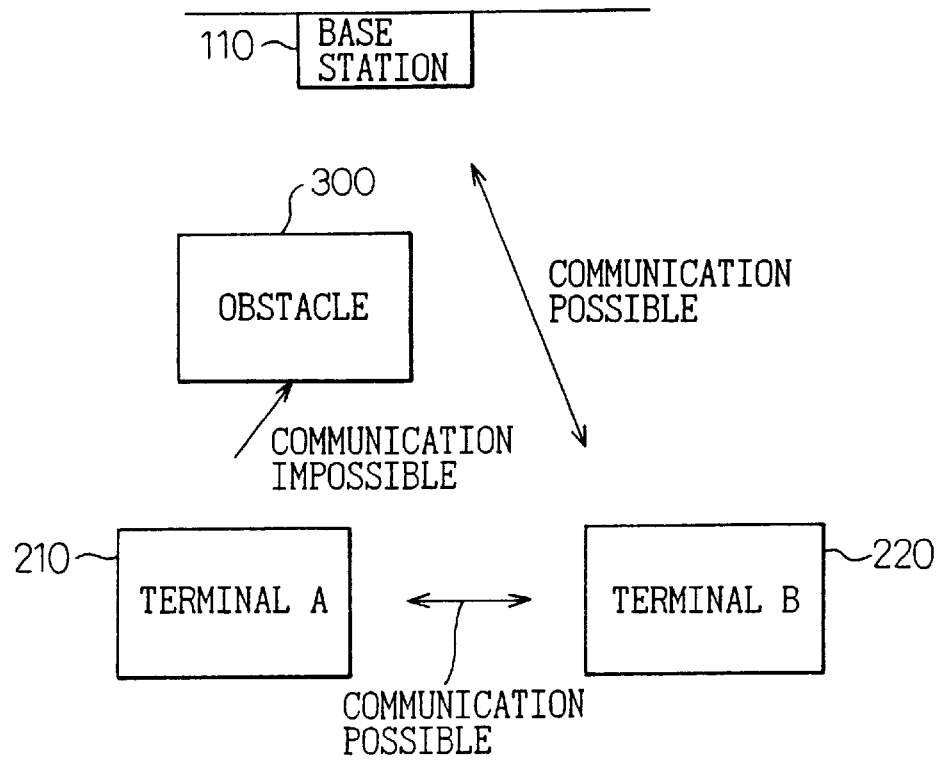
FIGS. 1A and 1B show the operation of a system for transferring data by radio according to the present invention.
Figure 1B:
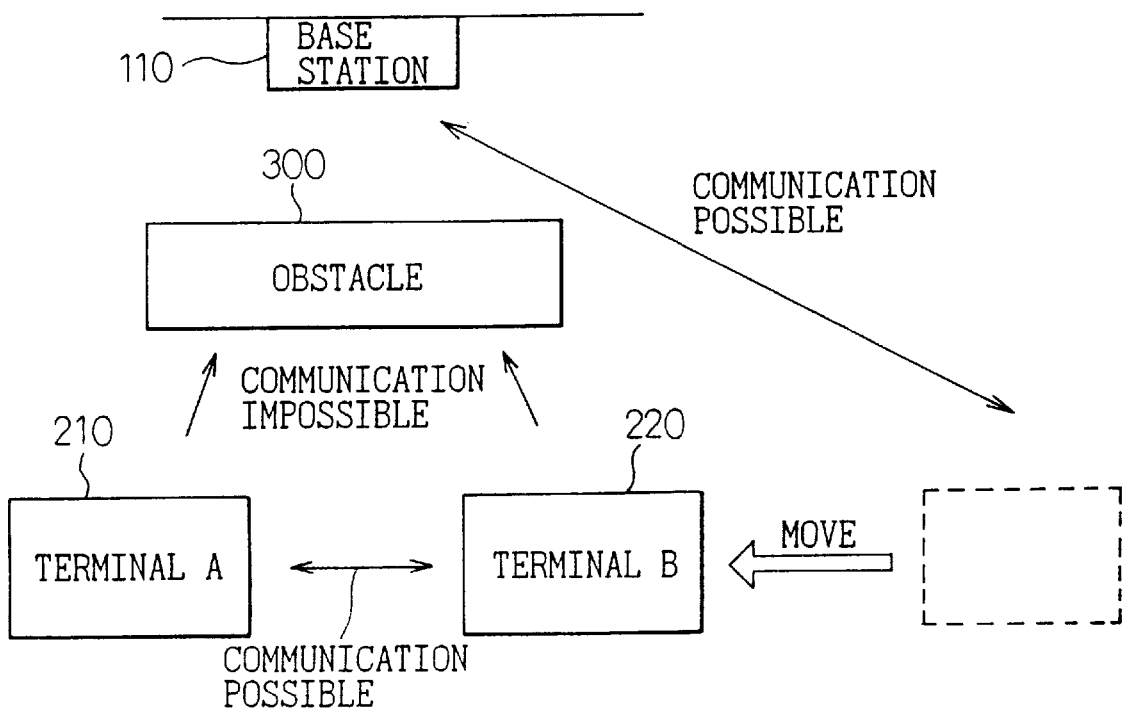

FIGS. 1A and 1B show wireless data transfer operations of the system of the present invention.

A terminal A (210) is unable to communicate with a base station 110 due to an obstacle 300, and therefore, is unable to download master data from a host computer through the base station 110. On the other hand, a terminal B (220) is able to communicate with the base station 110.

The terminal A communicates with the terminal B, to:

1) download the master data from the terminal B, if the terminal B has the master data, and if the terminal B does not have the same;

2) request the terminal B to download the master data from the host computer, and after the terminal B downloads the master data, download the same from the terminal B.

Instead of requesting the terminal B to download the master data from the host computer, the terminal A may, according to another aspect of the present invention;

3) use the terminal B as a relay to transfer the master data from the host computer to the terminal A.

In the cases 1) and 2), the terminal A downloads the master data from the terminal B. Therefore, there will be no problem even if the terminal B moves to another location after downloading the master data and becomes unable to communicate with the host computer. Compared with the case 2), the case 3) involves only one time of downloading operation to shorten a data transfer time and reduce a memory space of the terminal B.

FIG. 2 shows a supermarket employing the system of FIGS. 1A and 1B of the present invention.

This supermarket has three floors having base stations 1 to 3 (110, 120, and 130), respectively, to communicate with terminals arranged on the respective floors. The base stations 1 to 3 are connected to a common server 400, as indicated by thick lines. The server 400 is connected to a public line such as an ISDN to communicate with a host computer 500 installed in a distribution center.

With reference to FIGS. 1A, 1B, and 3 to 5, the details of the terminals A and B (210, 220), base station 1 (110), and server 400 that are hatched and arranged on the third floor of the supermarket will be explained. Like parts are represented with like reference marks through the drawings. An assumption is made that the server 400 has master data downloaded from the host computer 500.

FIG. 3 shows communication between the base station 1 (110) and the server 400.

The server 400 has an MPU 401, a ROM 402, and a RAM 403 to control the server 400 and communication with the host computer 500 and base stations 1 to 3. A communication unit 406 controls communication protocols to communicate with the host computer 500 and base stations 1 to 3. A data storage unit 405 temporarily stores the master data downloaded from the host computer 500. An input unit 404 and a display unit 407 are used to control the server 400.

The base station 1 has an MPU 111, a ROM 112, and a RAM 113 to control the base station 1 and communication with the server 400 and terminals A and B. A communication unit 116 controls communication protocols to communicate with the server 400 and terminals A and B. A radio unit 114 transmits and receives radio signals to and from the terminals A and B. A display unit 115 displays the operating and communication states of the base station 1.

Figure 4:
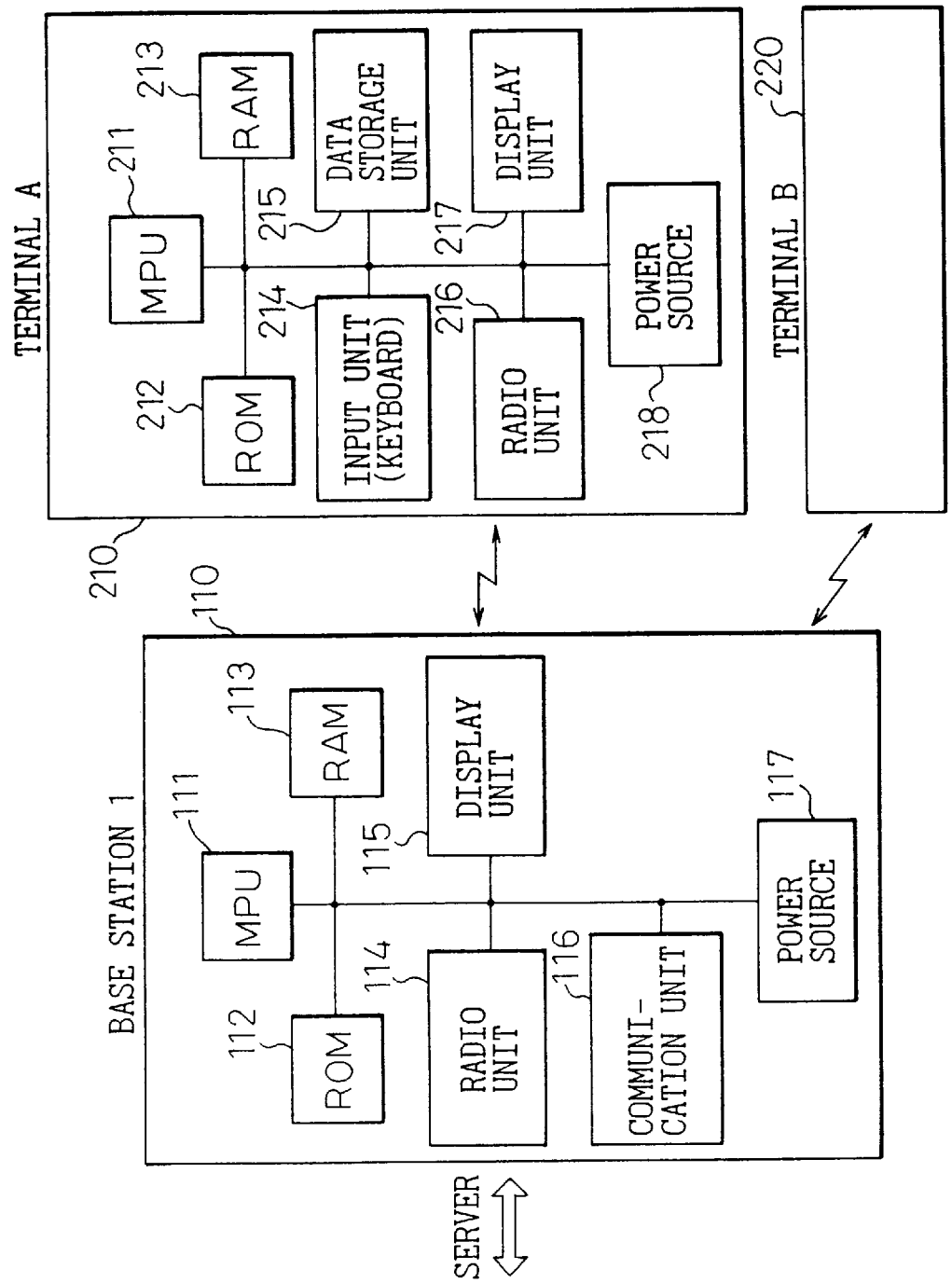
FIG. 4 shows communication between a base station 1 and terminals A and B of the system of FIG. 2.

FIG. 4 shows communication between the base station 1 and the terminals A and B.

The base station 1 is as explained with FIG. 3.

The terminal A has an MPU 211, a ROM 212, and a RAM 213 to control the terminal and communicate with the base station 1 and other terminals. The MPU 211 controls communication protocols related to the function of the communication unit 116 of the base station 1, to reduce cost. A data storage unit 215 temporarily stores the master data downloaded form the host computer 500 through the server 400 and base station 1. An input unit 214 and a display unit 217 are used by an operator to display data.

Figure 5:
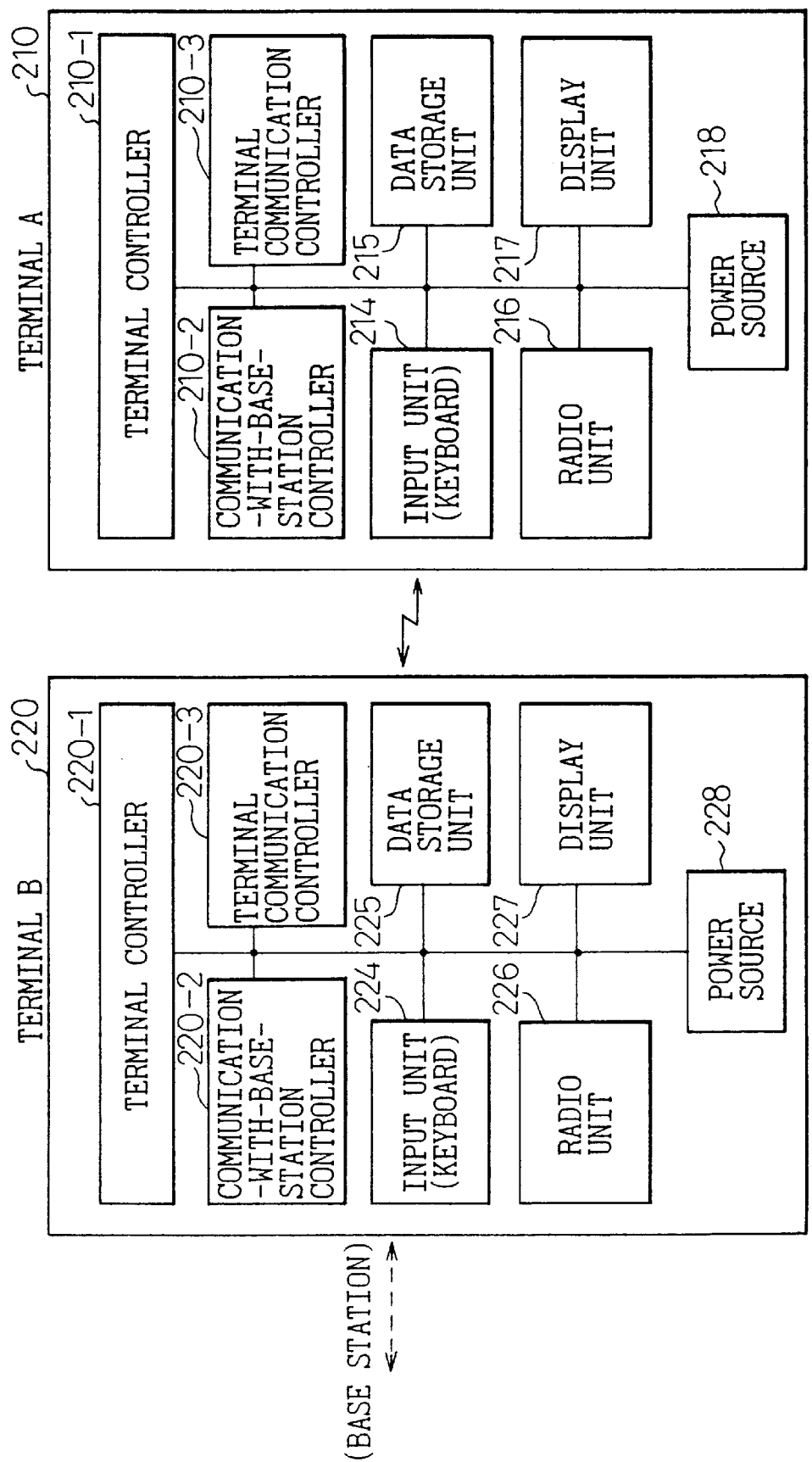
FIG. 5 shows communication between the terminals A and B of the system of FIG. 2.

FIG. 5 shows communication between the terminal A (210) and the terminal B (220).

As explained with FIGS. 1A and 1B, the present invention basically relates to communication between terminals. The terminal A in the example is unable to communicate with the base station 1, and therefore, is unable to download the master data. On the other hand, the terminal B is able to communicate with the base station 1 and helps the terminal A to download the master data. For the sake of clear understanding of the present invention, the terminal A (the terminal B also) of FIG. 5 shows functional blocks provided by the MPU 211, ROM 212, and RAM 213 of FIG. 4.

More precisely, the MPU 211, ROM 212, and RAM 213 provide a terminal controller 210-1 (220-1 in the terminal B) for controlling the terminal A, a communication-with-base-station controller 210-2 (220-2) for controlling communication with the base station 1, and a terminal communication controller 210-3 (220-3) for controlling communication with another terminal. The controller 210-3 carries out functions specific to the present invention, and the controller 210-2 carries out conventional functions.

Figure 6:
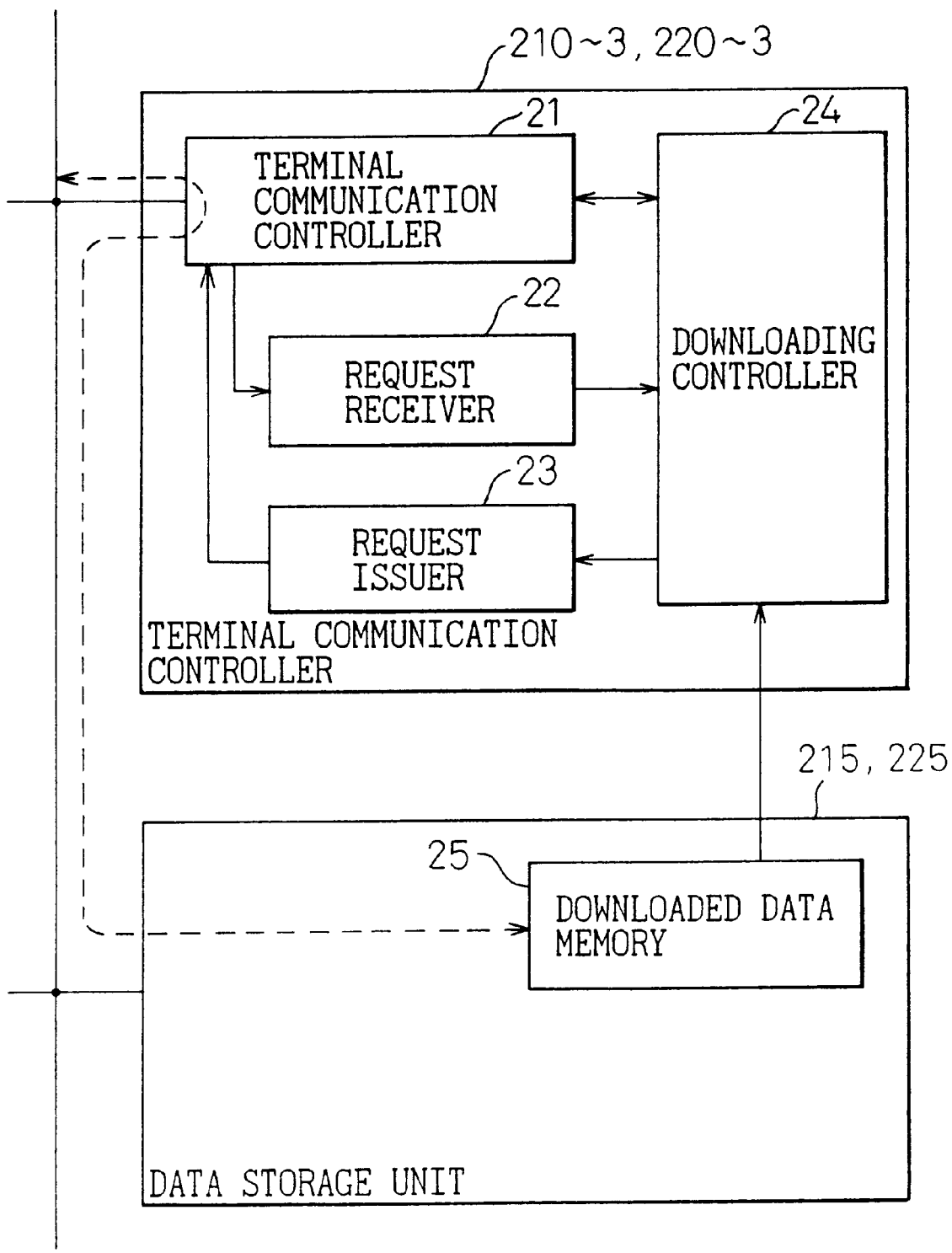
FIG. 6 shows the structure of a terminal communication controller of any one of the terminals of FIG. 5.

FIG. 6 shows functional blocks, more precisely, in the terminal communication controller 210-3 (220-3).

A terminal communication unit 21 controls communication with another terminal, stores data received from another terminal in a downloaded data memory 25 formed in the data storage unit 215 (225), and transmits the data stored in the memory 25 to another terminal as indicated with a dotted line.

A request receiver 22 receives a request, to download data, from another terminal through the terminal communication unit 21. A request issuer 23 issues a request to download data, to another terminal, through the unit 21.

If a downloading controller 24 acknowledges that the terminal A is unable to communicate with the base station 1, it instructs the request issuer 23 to issue a request to the terminal B, which is able to communicate with the base station 1, to download the data for the terminal A.

In the terminal B, the request receiver 22 receives the request, and the downloading controller 24 checks to see if the memory 25 has the data. If the memory 25 has the data, the controller 24 instructs the terminal communication unit 21 to transmit the data to the terminal A. If the memory 25 does not have the data, the controller 24 asks the communication-with-base-station controller 220-2 to relay signals between the terminal A and the base station 1.

The system for, and a method of, transferring data by radio according to the present invention will be explained in detail with reference to FIGS. 7A, 7B, and 8 to 13.

Figure 7A:
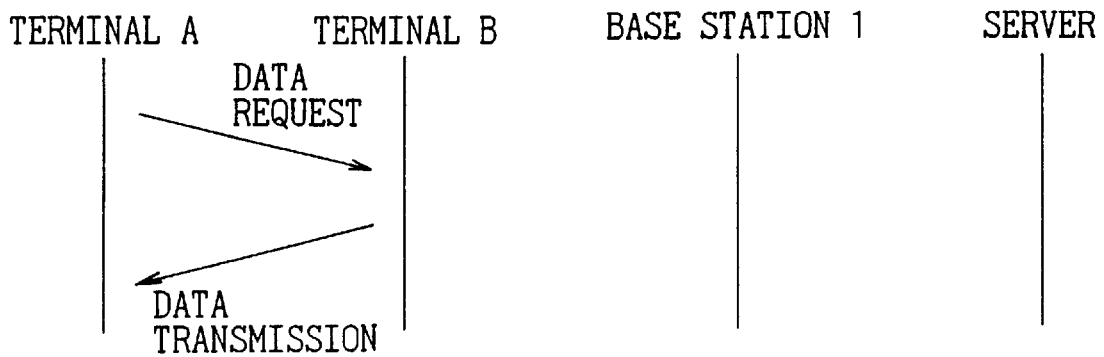
FIGS. 7A and 7B show communication sequences according to the present invention.
Figure 7B:
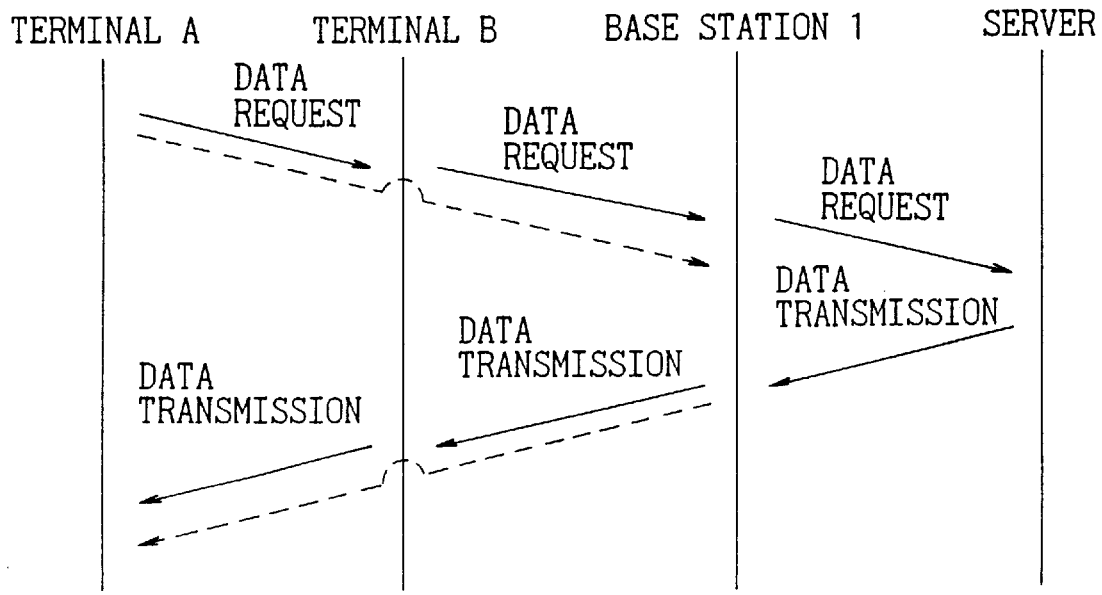

FIG. 7A shows a sequence of transferring master data from the terminal B (220) to the terminal A (210). In this example, the terminal B already has the master data. FIG. 7B shows a sequence of downloading the master data from the server 400 to the terminal A through the base station 1 and the terminal B that does not have the master data.

Figure 8:
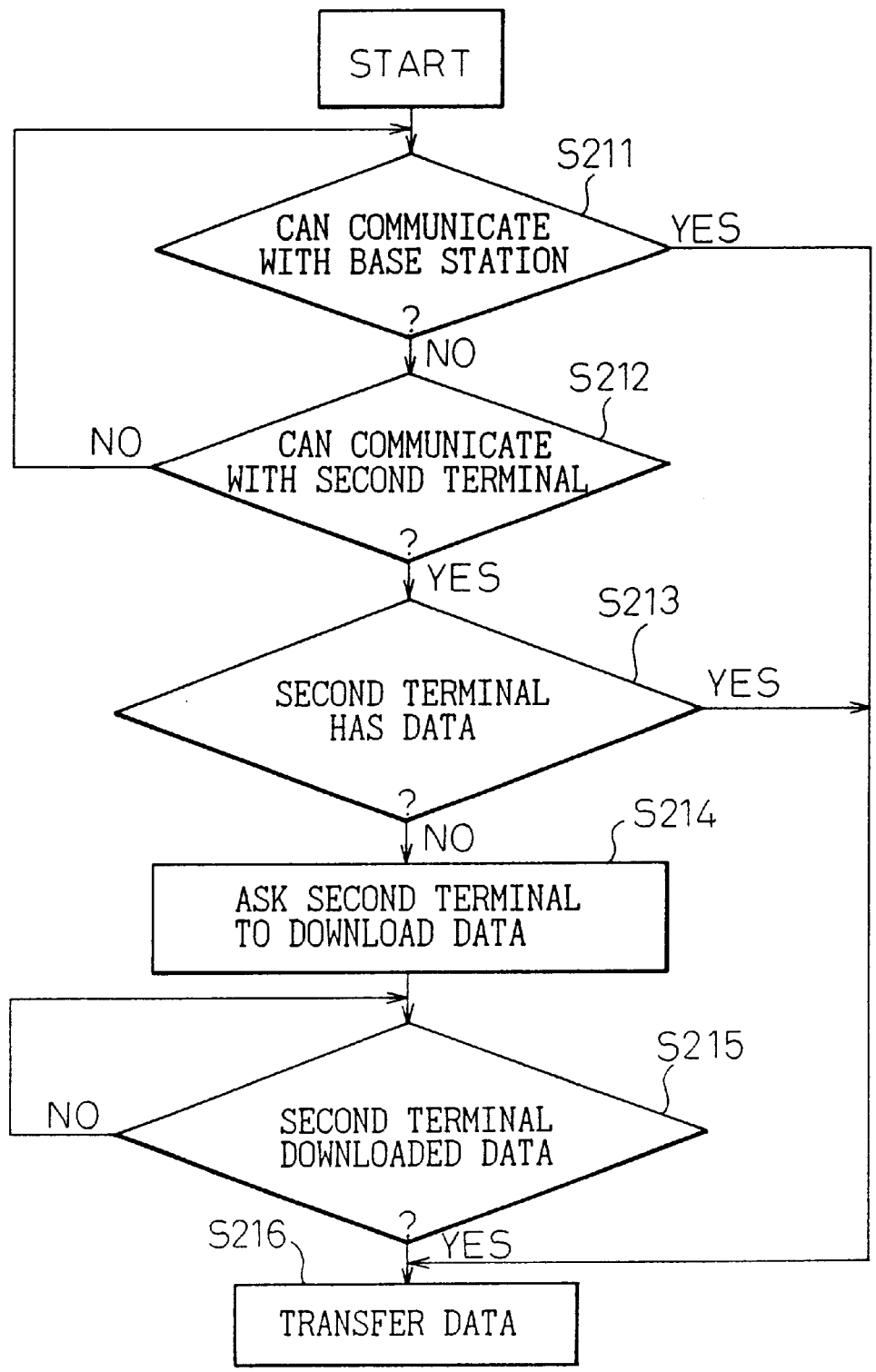
FIGS. 8 and 9 show control flows of the terminal A according to the present invention.

In FIG. 8, the communication-with-base-station controller 210-2 of the terminal A checks to see if the terminal A is able to communicate with the base station 1 in step S211. If it is, the master data is downloaded from the server 400 to the terminal A through the base station 1 in step S216, and if not, the terminal communication controller 210-3 takes control.

The controller 210-3 tries to communicate with the terminal B in step S212. If communication with the terminal B is successful, step S213 checks to see if the terminal B has the master data. If it has, step S216 receives the master data from the terminal B, and if not, step S214 request the terminal B to download the master data. Step S215 checks to see if the terminal B has completely downloaded the master data. If it has, step S216 receives the master data from the terminal B. This sequence is also shown in FIG. 7B.

Figure 10:
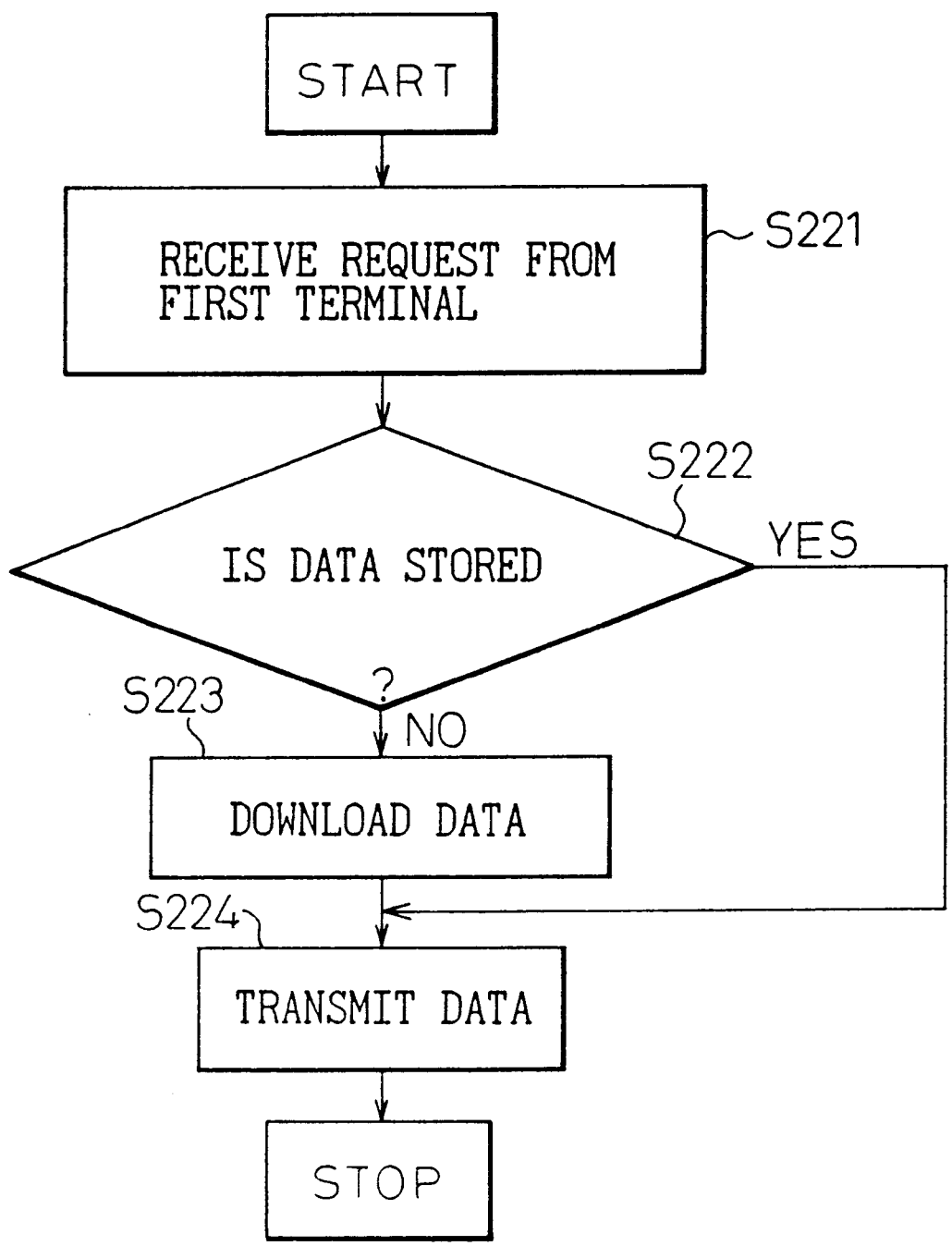
FIGS. 10 and 11 show control flows of the terminal B according to the present invention.

In FIG. 10, the terminal communication controller 220-3 of the terminal B receives, in step S221, the request from the terminal A to download the master data. Step S222 checks to see if the terminal B has the master data. If it has, step S224 transfers the master data to the terminal A, and if not, step S223 downloads the master data from the server 400 through the base station 1 and step S224 transfers the downloaded data to the terminal A.

Figure 12:
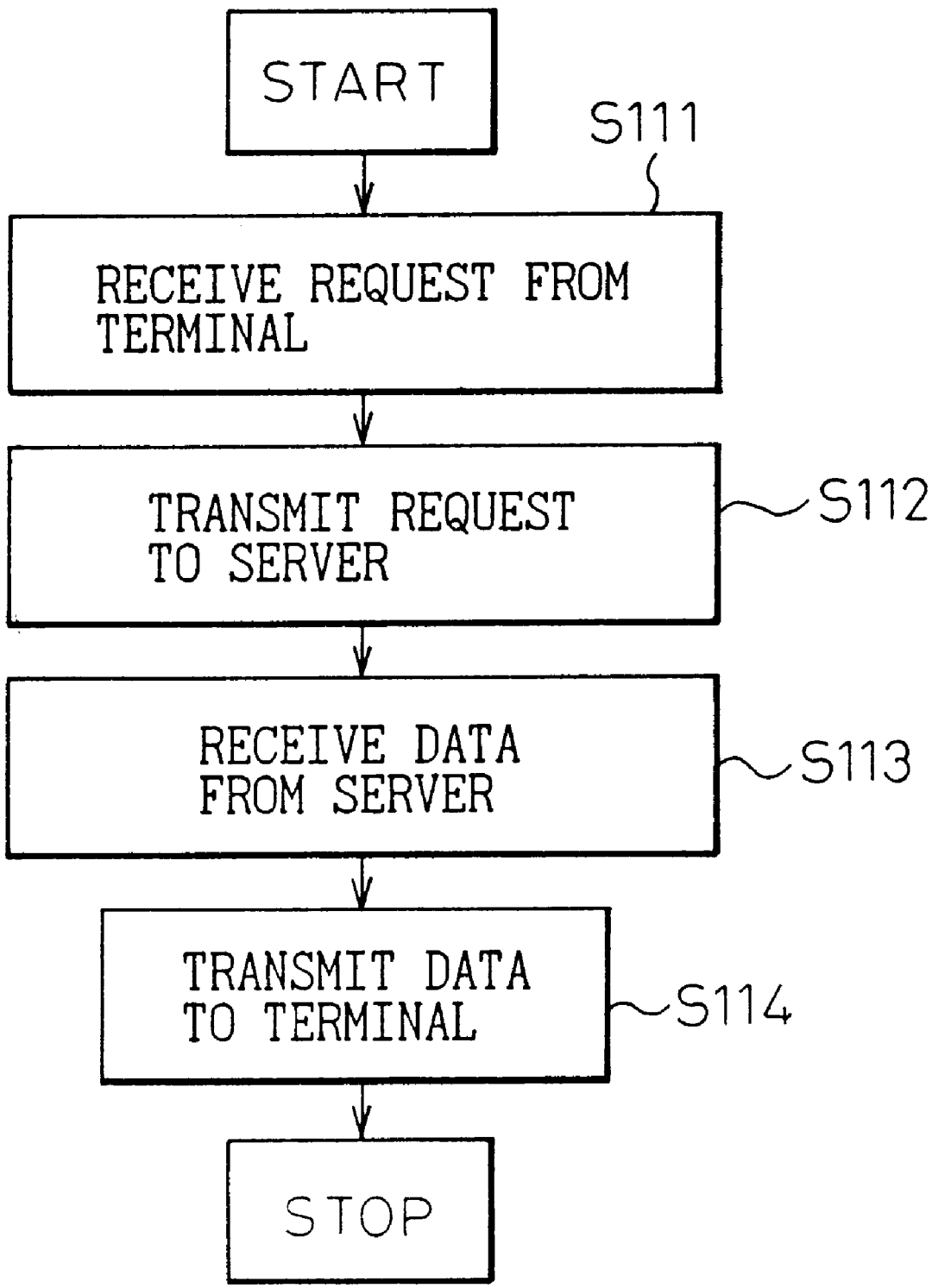
FIG. 12 shows a control flow of the base station 1 according to the present invention.

FIG. 12 shows a control flow of the base station 1 in the case of FIG. 7B, and FIG. 13 shows a control flow of the server 400 in the same case. In FIG. 12, the base station 1 receives in step S111 a request from the terminal B to transfer the master data, and transfers the request to the server 400 in step S112. The base station 1 receives the master data from the server 400 in step S113, and transfers the same to the terminal B in step S114. As is apparent in FIG. 3, the base station 1 has no data storage unit.

In FIG. 13, the server 400 receives the request for the master data from the base station 1 in step S401 and transmits the master data to the terminal B through the base station 1 in step S402. In this example, the data storage unit 405 of the server 400 already has the master data downloaded from the host computer 500. If the server 400 does not have the master data, the server 400 requests the host computer 500 to send the master data thereto.

The processes mentioned above relate to the cases 1) and 2) of FIGS. 1A and 1B of the present invention. The case 3) of the present invention will be explained. In the case 3), the terminal B (220) that is able to communicate with the base station 1 (110) simply serves as a relay unit for transferring a data request and the master data between the terminal A (210) and the base station 1 as indicated with dotted lines in FIG. 7B.

Figure 9:
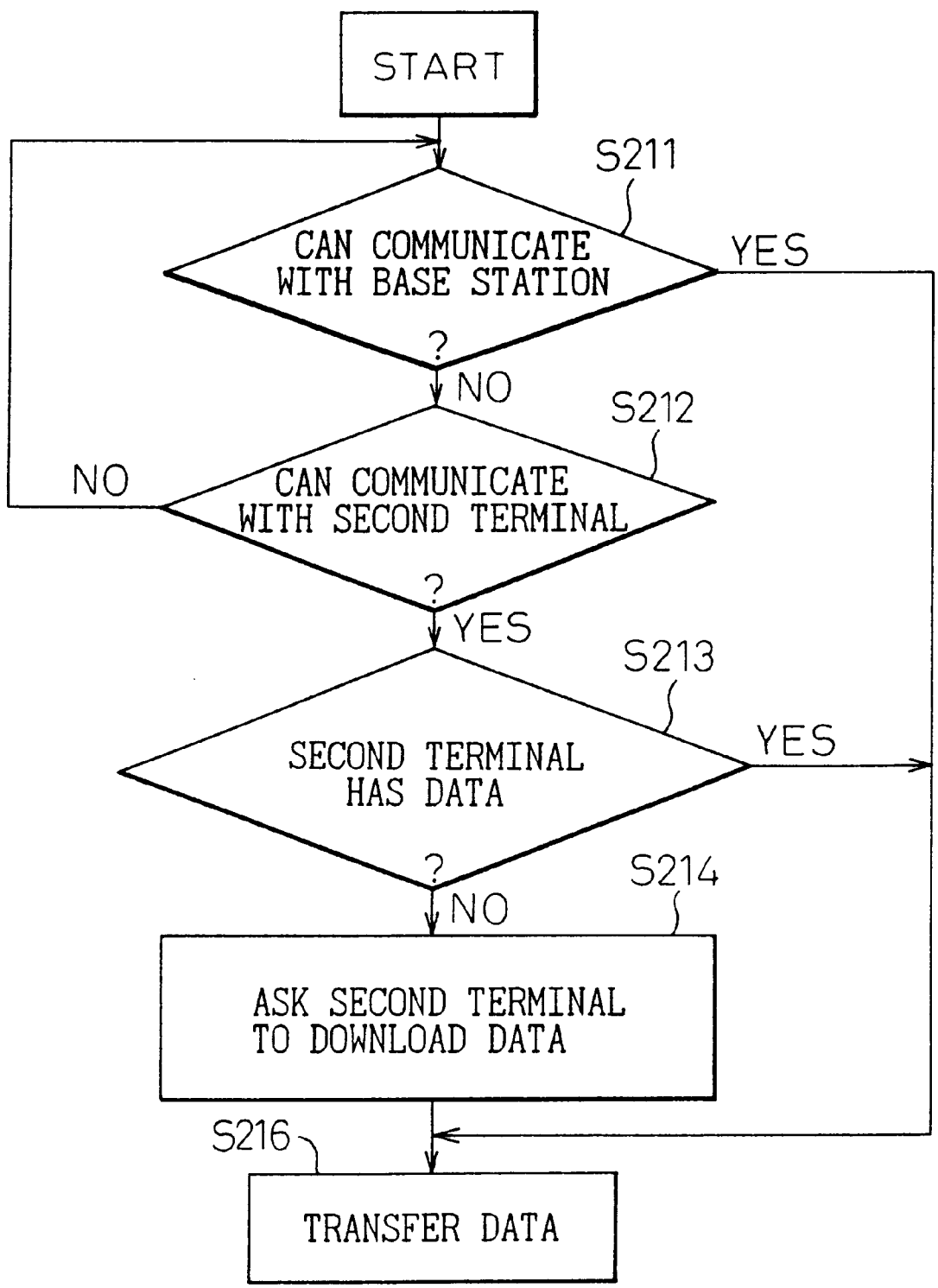

In FIG. 9, step S211 checks to see if the terminal A can communicate with the base station 1. If not, step S212 checks to see if the terminal A can communicate with the terminal B. Steps S213, S214, and S216 of FIG. 9 are the same as those of FIG. 8 already explained. FIG. 9 does not have step S215 of FIG. 8 to wait for the terminal B downloading the master data because the terminal B serves only as a relay in the case 3).

Figure 11:
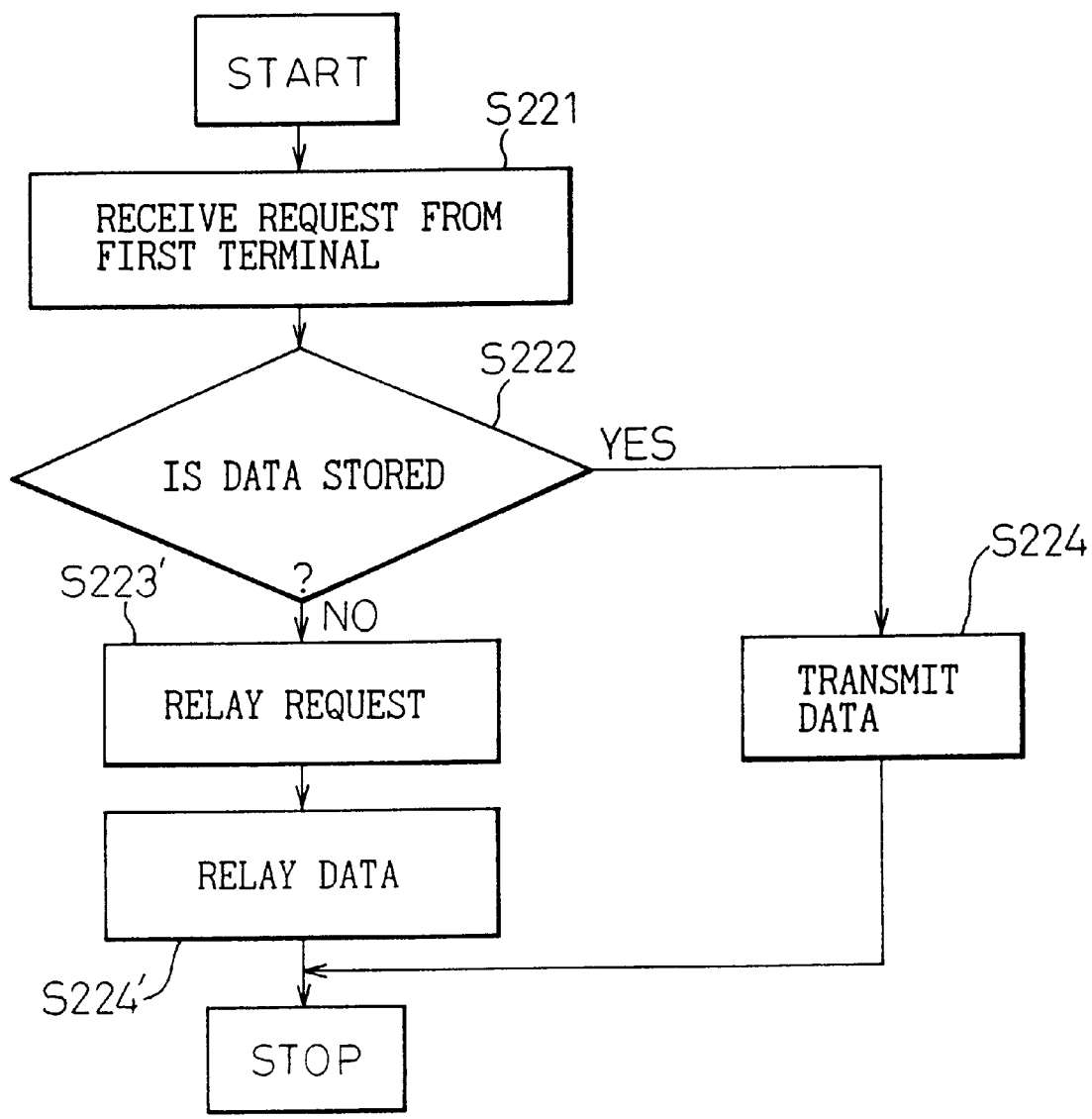

In the meantime, the terminal B operates as shown in FIG. 11. If step S222 determines that the terminal B has the master data, step S224 is carried out similar to FIG. 10. If the terminal B doe snot have the master data in step S222, the terminal B relays the request of the terminal A to the base station 1 in step S223', and relays the master data from the base station 1 to the terminal A in step S224'. Consequently, a download operation is carried out only once in step S216 of FIG. 9 by the terminal A. Since the terminal B operates only to relay the request and master data as shown in FIG. 11, the terminal B may have no memory for storing the data downloaded for the terminal A.

As explained above, a data requesting terminal according to the present invention tries to receive data from a second terminal if it is unable to communicate with a base station that functions to convey the data from a host computer to the data requesting terminal and if the second terminal has the data downloaded from the host computer.

If the second terminal does not have the data and if the second terminal is able to communicate with the base station, the present invention makes the second terminal download the data and transfer it to the data requesting terminal.

What is claimed is:

1. A data transfer system having a base station connected to a host system, and terminals for communicating with the base station and downloading data from the host system through the base station, each of the terminals comprising:

terminal communication control means for controlling the downloading of data between the terminals, the terminal communication control means having request means and transmission means, the request means issuing a request for data to another terminal if the terminal communication control means is unable to communicate with the base station to download the data, the transmission means transmitting data to another terminal in response to a request for the data, if the data is stored in its own terminal.

2. The system of claim 1, wherein the terminal communication control means further comprises:

means for downloading data through the base station, if the data is not stored in its own terminal, in response to a request for the data from a data requesting terminal; and means for transmitting the downloaded data to the data requesting terminal.

3. The system of claim 1, wherein the terminal communication control means further comprises:

means for relaying a request for data from a data requesting terminal to the base station if the data is not stored in its own terminal, and relaying the data from the base station to the data requesting terminal.

4. A terminal for communicating with a base station connected to a host system and downloading data from the host system through the base station, comprising:

communication control means for controlling communication with another device;

storage means for storing downloaded data; and means for determining whether or not communication with the base station is possible, and if it is impossible, requesting another terminal that is able to communicate with the base station to download data.

5. A terminal for communicating with other devices, comprising:

control means for controlling communication with other devices;

reception means for receiving, from a first device, a request for downloading data; and determination means for determining whether or not the data is stored in its own terminal, the terminal transferring the data to the first device if the data is stored therein, and if not, requesting a second device to download the data.

6. A method of transferring data from a host system to terminals through a base station, the base station being connected to the host system, the terminals communicating with the base station when downloading the data from the host system, comprising the steps of:

determining whether or not a first terminal that intends to download the data is able to communicate with the base station;

requesting a second terminal for the data if the first terminal is unable to communicate with the base station; and transmitting the data from the second terminal to the first terminal if the data is stored in the second terminal.

7. The method of claim 6, further comprising the steps of:

requesting the second terminal, which is able to communicate with the base station, to download the data if the first terminal is unable to communicate with the base station and if the data is not stored in the second terminal; and making the second terminal download the data through the base station and transmit the downloaded data to the first terminal.

8. The method of claim 7, further comprising the step of:

making the second terminal relay the data from the base station to the first terminal without downloading the data to the second terminal.

* * * * *